US012609025B2

(12) United States Patent
Gilbert-Eyres et al.

(10) Patent No.: US 12,609,025 B2
(45) Date of Patent: Apr. 21, 2026

(54) SIGNAGE MONITORING SYSTEM

(71) Applicant: GM Global Technology Operations LLC, Detroit, MI (US)

(72) Inventors: Matthew Edward Gilbert-Eyres, Rochester Hills, MI (US); Robert Weisbarth, New Boston, MI (US); Eric T. Hosey, Rochester Hills, MI (US); Russell A. Patenaude, Macomb Township, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 186 days.

(21) Appl. No.: 18/487,079

(22) Filed: Oct. 14, 2023

(65) Prior Publication Data

US 2025/0124784 A1 Apr. 17, 2025

(51) Int. Cl.
| | |
|---|---|
| G08G 1/052 | (2006.01) |
| G06V 20/58 | (2022.01) |
| G08G 1/04 | (2006.01) |
| G09F 21/04 | (2006.01) |

(52) U.S. Cl.
CPC ........... G08G 1/052 (2013.01); G06V 20/582 (2022.01); G08G 1/04 (2013.01); G09F 21/049 (2020.05)

(58) Field of Classification Search
CPC ........ G08G 1/052; G08G 1/04; G06V 20/582; G09F 21/049
See application file for complete search history.

(56) References Cited

U.S. PATENT DOCUMENTS

| | | | | |
|---|---|---|---|---|
| 6,147,637 | A * | 11/2000 | Morikawa | G01S 7/4004 |
| | | | | 356/28 |
| 8,200,901 | B1 * | 6/2012 | Wentzlaff | G06F 12/0808 |
| | | | | 711/119 |
| 8,547,251 | B2 * | 10/2013 | Goudy | G08G 1/164 |
| | | | | 340/901 |
| 8,676,506 | B1 * | 3/2014 | LaLiberte | G09B 29/106 |
| | | | | 711/119 |
| 10,453,337 | B2 * | 10/2019 | Anastassov | G08G 1/096758 |
| 2002/0120397 | A1 * | 8/2002 | Kepler | G01C 21/3644 |
| | | | | 701/426 |
| 2002/0152024 | A1 * | 10/2002 | Stefan | G01C 21/26 |
| | | | | 701/420 |
| 2003/0158660 | A1 * | 8/2003 | Krull | G01C 21/3415 |
| | | | | 701/410 |
| 2003/0229441 | A1 * | 12/2003 | Pechatnikov | G01C 21/3611 |
| | | | | 701/411 |

(Continued)

FOREIGN PATENT DOCUMENTS

| | | |
|---|---|---|
| DE | 102015203115 A1 | 9/2016 |
| DE | 102019209552 A1 | 12/2020 |
| JP | 6813595 B2 | 1/2021 |

*Primary Examiner* — Mussa A Shaawat
(74) *Attorney, Agent, or Firm* — Honigman LLP; Matthew H. Szalach; Jonathan P. O'Brien

(57) ABSTRACT

A signage monitoring system for a vehicle is disclosed. The signage monitoring system includes a vehicle processor storing data including vehicle location, vehicle event data, and existing outdoor signage information. The signage monitoring system also includes a server communicatively coupled to the vehicle processor and configured to determine existing outdoor signage effectiveness based on correlated vehicle event data and vehicle location data from a plurality of vehicles.

20 Claims, 4 Drawing Sheets

(56)          References Cited

U.S. PATENT DOCUMENTS

| | | | |
|---|---|---|---|
| 2005/0065711 A1* | 3/2005 | Dahlgren | G08G 1/096775 |
| | | | 701/117 |
| 2008/0046172 A1* | 2/2008 | Ames | G01C 21/28 |
| | | | 701/532 |
| 2008/0059055 A1* | 3/2008 | Geelen | G01C 21/26 |
| | | | 701/533 |
| 2008/0319658 A1* | 12/2008 | Horvitz | G01C 21/3644 |
| | | | 701/414 |
| 2010/0100324 A1* | 4/2010 | Caminiti | G01S 19/00 |
| | | | 701/301 |
| 2011/0238735 A1* | 9/2011 | Gharpure | G06F 16/29 |
| | | | 707/802 |
| 2014/0132767 A1* | 5/2014 | Sonnabend | G06V 20/63 |
| | | | 348/148 |
| 2015/0141056 A1* | 5/2015 | Fefilatyev | G01C 21/3856 |
| | | | 455/456.3 |
| 2015/0227965 A1 | 8/2015 | Drysch et al. | |
| 2018/0045517 A1* | 2/2018 | Ahuja | B61L 25/025 |
| 2019/0156714 A1* | 5/2019 | Isgar | G08G 1/093 |
| 2019/0178671 A1* | 6/2019 | DeLuca | G01C 21/3608 |
| 2019/0362165 A1* | 11/2019 | Bender | G06V 20/582 |
| 2020/0262438 A1* | 8/2020 | Bai | G08G 1/0112 |
| 2021/0269054 A1* | 9/2021 | Stayton | G01C 21/3605 |
| 2021/0323540 A1* | 10/2021 | De Weser | G06F 18/24 |
| 2021/0327269 A1* | 10/2021 | Grace | G05D 1/247 |
| 2022/0067405 A1* | 3/2022 | Kim | G06V 10/82 |
| 2022/0327927 A1* | 10/2022 | Yilma | G08G 1/0133 |
| 2023/0169779 A1* | 6/2023 | Nessler | G01C 21/30 |
| | | | 701/409 |
| 2024/0194058 A1* | 6/2024 | Monninger | G08G 1/0112 |
| 2025/0033660 A1* | 1/2025 | Jenkin | B60W 40/02 |
| 2025/0252461 A1* | 8/2025 | Mongeau | G06Q 30/0269 |

* cited by examiner

Reaction Flow

SIGNAGE MONITORING SYSTEM

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a signage monitoring system.

Road signs and markers are an essential part of the road network and are critical to ensuring road safety. Road signs provide valuable information to drivers, pedestrians, and other road users about the road conditions ahead, including hazards, speed limits, directions, and traffic rules.

When these signs or markers go missing due to vandalism, accidents, or other reasons, public safety is impacted. For example, if a stop sign is missing, drivers will not know to stop at an intersection and may cause an accident. Another potential situation could be caused if road markers such as lane dividers, stop lines, or turn lanes are missing. As such, a need remains to detect missing or broken road signs to mitigate the impact on public safety.

SUMMARY

In some examples, a signage monitoring system for a vehicle includes a vehicle processor storing data including vehicle location, vehicle event data, and existing outdoor signage information. The signage monitoring system also includes a server communicatively coupled to the vehicle processor and configured to determine existing outdoor signage effectiveness based on correlated vehicle event data and vehicle location data from a plurality of vehicles. In some examples, at least one of the data stored by the vehicle processor is captured through video taken by cameras disposed on the vehicle. In some examples, the server is configured to determine existing outdoor signage effectiveness based on whether vehicle event data and existing outdoor signage information correlation is above a predetermined correlation threshold. Additionally, in some examples, if the server determines the existing outdoor signage effectiveness is less than the predetermined correlation threshold, the server is configured to display a sign through augmented reality to the user. In some examples, the server continues to display the sign through augmented reality to the user until the vehicle leaves the vehicle location. Moreover, in some examples, vehicle event data is based on a vehicle event including one or more of change in vehicle speed, change in vehicle direction, or change in vehicle lane. In some examples, the data stored by the vehicle processor is stored in the vehicle processor for less than approximately 15 minutes. Additionally, in some examples, a vehicle incorporates the signage monitoring system.

In some examples, a signage monitoring system for a vehicle includes a vehicle processor storing data including vehicle location, vehicle event data, and existing outdoor signage information. The signage monitoring system also includes a server communicatively coupled to the vehicle processor and configured to determine occurrence of a vehicle event using vehicle event data, correlate vehicle event data, vehicle location, and existing outdoor signage information, determine effectiveness of outdoor signage based on the correlation of vehicle event data, vehicle location, and existing outdoor signage information, and recommend changes to the existing outdoor signage. In some examples, at least one of the data stored by the vehicle processor is captured through video taken by cameras disposed on the vehicle. In some examples, the server is configured to determine if the existing outdoor signage is effective based on whether vehicle event data and existing outdoor signage information correlation is above a predetermined correlation threshold. In some examples, if the server determines the existing outdoor signage effectiveness is less than the predetermined correlation threshold, the server is configured to display a sign through augmented reality to the user. In some examples, the server continues to display the sign through augmented reality to the user until the vehicle leaves the vehicle location. In some examples, vehicle event data is based on a vehicle event including one or more of change in vehicle speed, change in vehicle direction, or change in vehicle lane.

In some examples, a signage monitoring system for a vehicle includes a vehicle processor storing data including vehicle location, vehicle event data, and existing outdoor signage information. The signage monitoring system also includes a server communicatively coupled to the vehicle processor and configured to determine occurrence of a vehicle event, correlate vehicle event data, vehicle location, and existing outdoor signage information, determine whether existing outdoor signage information is effective based on the correlation of vehicle event data, vehicle location, and existing outdoor signage information, and display signage via augmented reality if existing outdoor signage information is determined to be ineffective. In some examples, at least one of the data stored by the vehicle processor is captured through video taken by cameras disposed on the vehicle. In some examples, the server is configured to determine if the existing outdoor signage is effective based on whether vehicle event data and existing outdoor signage information correlation is above a predetermined correlation threshold. In some examples, the server continues to display the sign through augmented reality to the user until the vehicle leaves the vehicle location. In some examples, vehicle event data is based on a vehicle event including one or more of change in vehicle speed, change in vehicle direction, or change in vehicle lane. Additionally, in some examples, the signage monitoring system is incorporated into a vehicle.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
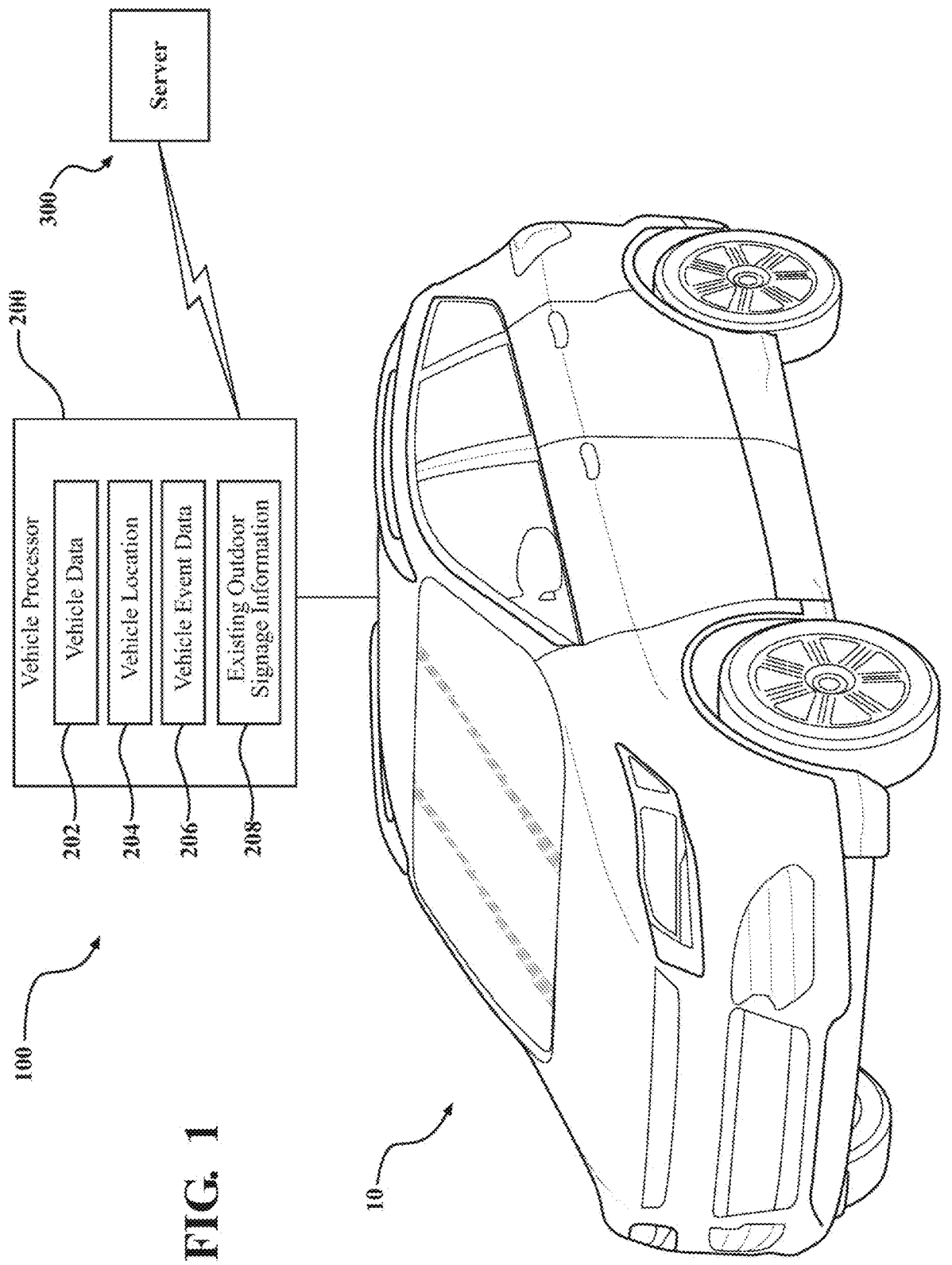
FIG. 1 is a perspective view of a vehicle including a vehicle processor in communication with a server in accordance with the present disclosure.
Figure 2:
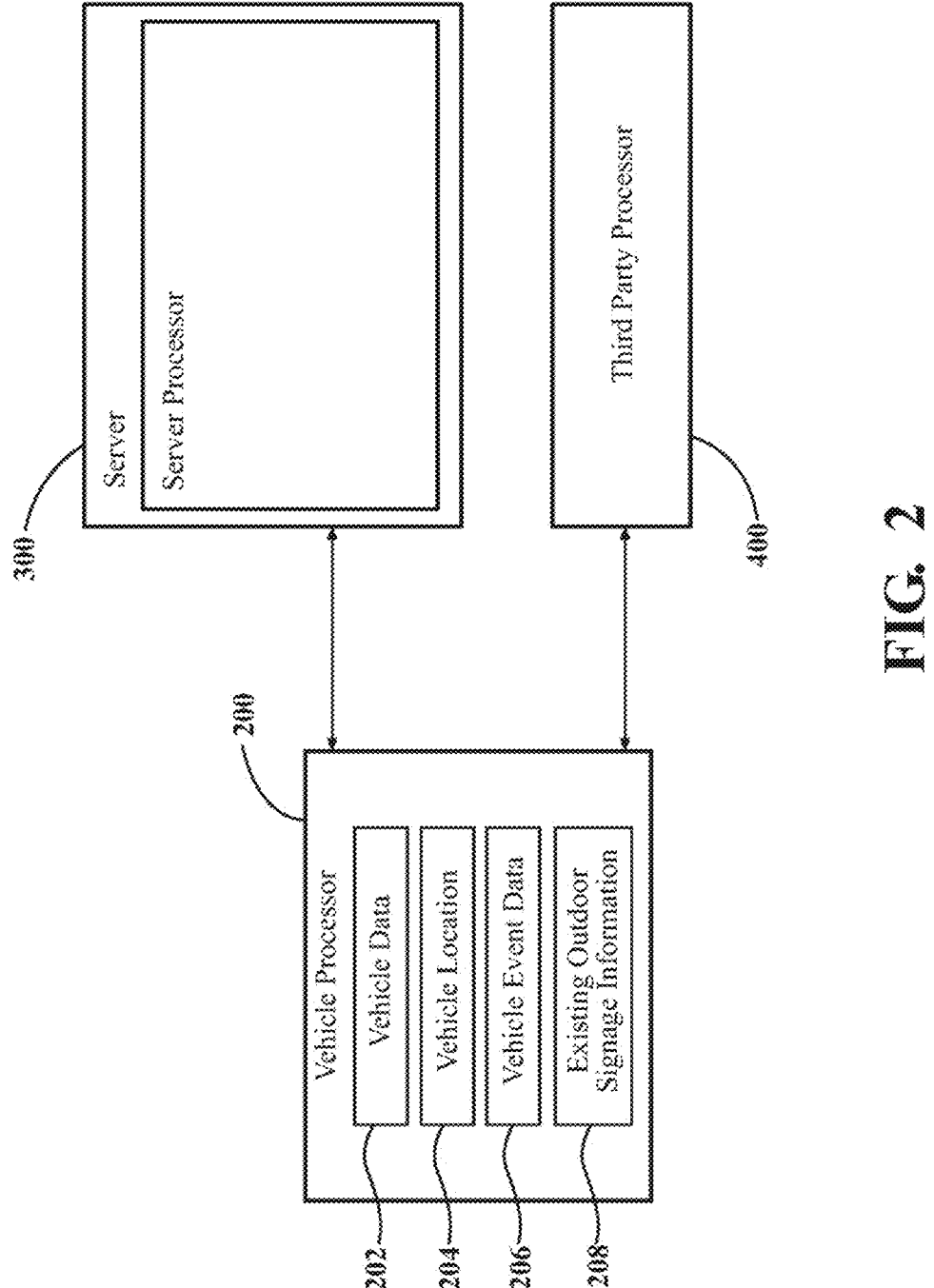
FIG. 2 is a functional block diagram showing the vehicle processor of FIG. 1 in communication with the server and a third-party processor according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, a signage monitoring system 100 for a vehicle 10 includes a vehicle processor 200 that stores vehicle data 202 of the vehicle 10. The monitoring system 100 may also include a server 300, described in more detail below, communicatively coupled with the vehicle processor 200. The vehicle 10, described below, is contemplated to be an electric vehicle (EV) and may include autonomous or semi-autonomous capabilities. Additionally or alternatively, the vehicle 10 may be a hybrid vehicle incorporating both EV and internal combustion engine (ICE) components and capabilities. Additionally, the vehicle 10 may include only an internal combustion engine or other power source, if desired.

The vehicle data 202 includes vehicle location, vehicle event data 206, and existing outdoor signage information 208. The vehicle location generally pertains to a location of the vehicle. The vehicle location may be gathered from a Global Positioning System (GPS) or other navigation system and communicated to the vehicle processor 200. Alternatively, the vehicle location may be gathered from a user device or a third party application and communicated to the vehicle processor 200. Moreover, the vehicle location data 204 may include route data such that a route the vehicle 10 is traveling may also be communicated to the vehicle processor 200.

The vehicle event data 206 generally pertains to actions the vehicle 10 takes during operation. Vehicle event data 206 may be gathered by any vehicle sensors and/or vehicle cameras used for other applications and communicated to the vehicle processor 200 for further processing. In some examples, vehicle event data 206 may include vehicle speed, vehicle lane merges, vehicle steering wheel angle, vehicle crosswalk data, or other vehicle operations. In some examples, the vehicle speed may pertain to what the current speed of the vehicle 10 is, whether the vehicle 10 has stopped, whether the vehicle 10 has quickly changed speed, and other vehicle speed-related events. In some examples, the vehicle lane merge data may pertain to whether a lane change by the vehicle 10 has been detected and/or whether a lane has ended based on visual evidence from the vehicle camera. In some examples, vehicle steering wheel angle may pertain to what is the current angle of the steering wheel and whether the angle of the sterling wheel has quickly changed indicating a vehicle turn. In some examples, the vehicle crosswalk data includes whether the vehicle camera has detected a pedestrian cross walk. Other examples of vehicle event data 206 have also been contemplated.

The outdoor signage information generally pertains to any signage information including, but not limited to, roadside signage or above-road signage. Typically, the outdoor signage information is gathered through the vehicle camera and communicated to the vehicle processor 200. However, it is contemplated that the vehicle signage information may additionally and/or alternatively be gathered through crowdsourcing. Specifically, vehicle signage information may be gathered from nearby vehicles traveling in close proximity to the vehicle 10. Data from nearby vehicles may be gathered through Bluetooth®, WI-Fi, third-party applications, or other similar methods.

With further reference to FIGS. 1-4, the server 300 is configured as a network and/or a cloud-based system that communicates with the vehicle processor 200. The server 300 is also configured to communicate with third-party processors 400 to collect third-party data. For example, the third-party processors 400 may include, but are not limited to, vehicle processors associated with other vehicles travelling along the route on which the vehicle 10 is traveling. Additionally or alternatively, the third-party processors 400 may include processors associated with third-party user devices such as mobile phones and/or tablets (neither shown) traveling within vehicles along the same route as the vehicle 10. It is generally contemplated that the third-party data includes vehicle location data 204, vehicle event data 206, and/or outdoor signage information 208 from the third-party processors 400. In some examples, the vehicle location data 204 is communicated to the server 300 and is indicative of the vehicle location of each respective vehicle traveling along the route. In some examples, the vehicle event data 206 is communicated to the server 300 and includes, but is not limited to, vehicle speed, vehicle lane merges, vehicle steering wheel angle, vehicle crosswalk data, or other vehicle operations of each respective vehicle traveling along the route. In some examples, the outdoor signage information is communicated to the server 300 and includes signage information gathered from each respective vehicle traveling along the route.

It is also contemplated that the vehicle processor 200 may communicate any or all of the vehicle data 202 to the server 300 for further processing and/or evaluation in some examples. It is also contemplated that the vehicle processor 200 and/or the server 300 may continuously and/or regularly update such that the vehicle data 202 is updated in real time.

Referring still to the example shown in FIGS. 1-4, the server 300 is configured to determine existing outdoor signage effectiveness based on correlated data including, but not limited to, one or more of vehicle event data 206, vehicle location data 204 from the current vehicle and/or a plurality of vehicles, and existing outdoor signage information 208. Specifically, the server 300 is configured to correlate vehicle event data 206 with the vehicle location 204 and the existing outdoor signage information 208 to determine whether the existing outdoor signage is effective. For example, the server 300 is configured to correlate data pertaining to what the current vehicle action is versus historical vehicle data. More specifically, if the vehicle speed remains constant at a location that historical vehicle data 200 shows the vehicle speed typically comes to a stop, the server 300 may determine that the existing outdoor signage information is currently ineffective.

Additionally, in some examples, the server 300 is configured to determine an occurrence of a vehicle event using vehicle event data 206, correlated vehicle event data, vehicle location 204, and existing outdoor signage information 208. More specifically, the server 300 may determine whether a vehicle event such as a rapid stop, a vehicle swerve, a vehicle speed increase, a lane merge, or the like has occurred. For example, the server 300 may use the vehicle data to detect that a lane merge has occurred. That vehicle event may then be correlated with the vehicle location 204 and existing outdoor signage 208 information to assist in determining whether the current outdoor signage is effective.

Referring still to the example shown in FIGS. 1-4, the server 300 is configured recommend changes to the existing outdoor signage. For example, if the server 300 determines that the existing outdoor signage information is ineffective, the server 300 may contact a traffic authority or local road commission directly. Additionally, in some examples, the server 300 may prompt the user to contact the appropriate authority to report the ineffective signage.

Moreover, in some examples, the server 300 may also be configured to display signage via augmented reality if the existing outdoor signage information is determined to be ineffective. For example, if the existing outdoor signage information is determined to be ineffective for a speed limit sign along the vehicle route, the server 300 may display the correct speed limit or otherwise alert the driver of the correct speed limit through audio or other augmented reality techniques.

Figure 3:
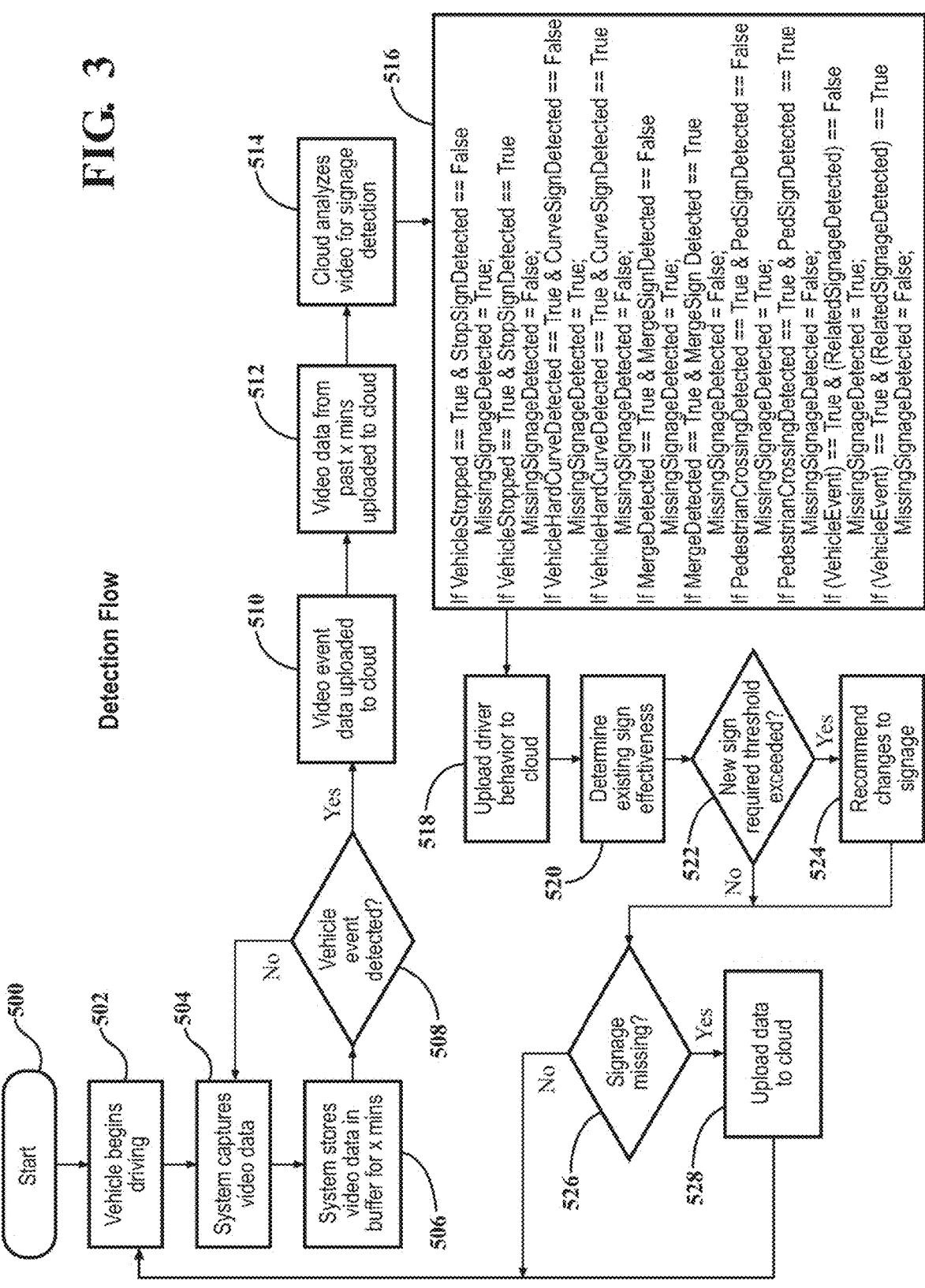
FIG. 3 is an example flow diagram of a signage monitoring system according to the present disclosure.
Figure 4:
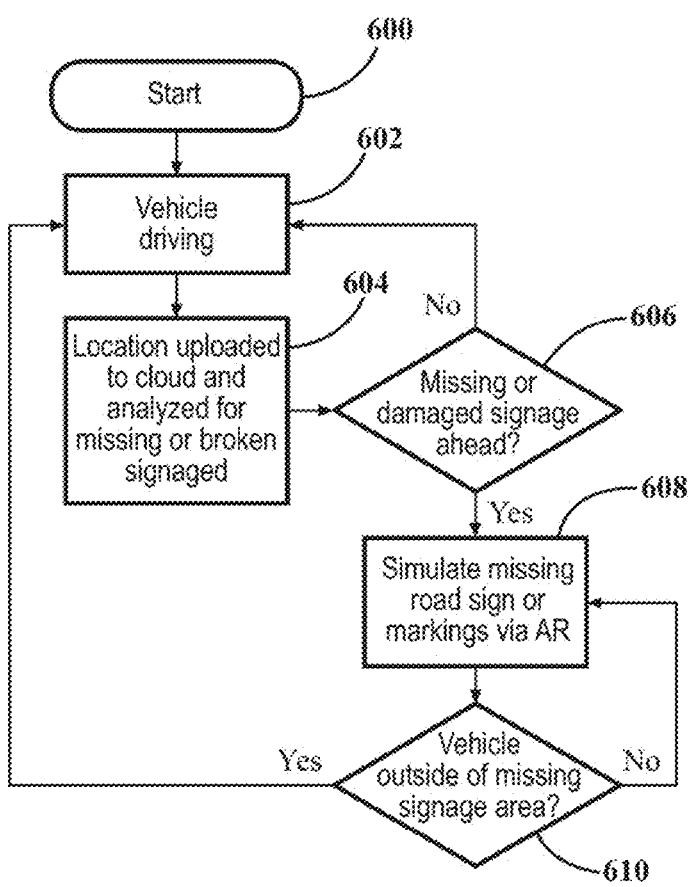
FIG. 4 is an example flow diagram of a signage monitoring system according to the present disclosure.

Referring now to FIGS. 3 and 4, an example flow diagram of operations of the signage monitoring system 100 is provided. In an initial step at 400, the vehicle is off before the user activates the ignition and begins driving at step 502. Once the vehicle 10 begins driving, the vehicle processor 200 begins capturing and recording vehicle data 202 at step 504. In some examples, capturing and recording the vehicle data 202 may include recording forward facing cameras and capturing vehicle event data 206 and vehicle location data 204 through other internal sensors and systems. In some examples, the video data is continuously stored by the vehicle processor 200. At step 506, the video data is stored for approximately 15 minutes or less. The vehicle data 202 may be stored by the vehicle processor 200 for approximately ten (10) minutes or less, approximately seven (7) minutes or less, or approximately five (5) minutes or less. If vehicle event data 206 is detected, the stored vehicle event data 206 is communicated to the server 300. Additionally, if a vehicle event is detected, stored video data is also communicated to the server 300 at steps 508, 510, and 512. Moreover, it is contemplated that the vehicle location during the vehicle event is also communicated to the server 300 if a vehicle event is detected.

Once the vehicle data 202 including the vehicle event data 206 and the video data is communicated to the server 300, the server 300 is configured to analyze the video data at step 514 to determine whether outdoor signage is visible near the location of the vehicle event. In some examples, the server 300 uses an algorithm, examples of which are illustrated at step 516, to determine whether the vehicle event data 206 indicates that outdoor signage is missing by correlating vehicle event data 206 with information relating to the presence of outdoor signage. For example, if the vehicle 10 is stopped (true at 516) and a stop sign is not detected (false at 516)—by a vehicle camera, for example—a missing stop sign is determined (true at 516). The results of the correlation are then uploaded to the server 300 along with driver behavior at 518.

Referring still to the example illustrated in FIG. 3, the existing sign effectiveness is determined at step 520. In some examples, the existing sign effectiveness is determined using the correlated vehicle data 202 from the vehicle 10 in addition to correlated vehicle data 202 from various other vehicles along the route. In some examples, the server 300 may use a correlation threshold to determine whether the correlation of vehicle event data 206 and outdoor signage information reaches a pre-determined correlation threshold at which the server 300 determines that the outdoor signage information is ineffective at step 522. Even if a sign is detected by the video data, consistent vehicle event data 206 in opposition of the existing sign may also trigger the server 300 to determine that the current signage is ineffective. Determination that current signage is ineffective may mean that the current signage is missing, damaged, and/or needs updating to be more effective. For example, if vehicle data 202 along the route indicates that vehicles are consistently speeding at a certain location, the signage at that location may be determined to be ineffective.

The server 300 may also store the vehicle data 202 for a period of time such that new vehicle data 202 may be compared to current vehicle data 202 is help determine sign effectiveness. For example, if vehicle data 202 indicates that vehicles are consistently not stopping at a location, while historical data shows that vehicles were previously consistently stopping at the location, the server 300 may determine that the current signage is ineffective. The server 300 continues to collect vehicle data 202 until the pre-determined threshold for effectiveness is reached. In some examples, once the pre-determined threshold for effectiveness is reached, the server 300 is configured to recommend changes to signage at step 524. The changes may be recommended to the state department of transportation or other relevant entities so that signage can be updated. In some examples, the server 300 may also be configured to continue checking whether the signage is ineffective at step 526 and upload data regarding effectiveness at step 528.

Referring now to the example illustrated in FIG. 4, in an initial step, the user activates the ignition and begins driving at step 602. Once the vehicle 10 begins driving, the vehicle processor 200 begins capturing and recording vehicle data 202. In some examples, such as the example illustrated in FIG. 4, the vehicle data 202 includes the vehicle location 204 and/or vehicle route information. The vehicle location 204 and/or vehicle route information is then communicated to the server 300 where it is analyzed to determine whether known ineffective signage is ahead on the vehicle route at step 604. This known ineffective signage information may be calculated using the example illustrated in FIG. 3, or gathered from other third-party processors 400.

If it is determined that ineffective signage is ahead at step 606, effective signage can be displayed via augmented reality or otherwise communicated by the vehicle processor 200 at step 608. For example, if it is determined that a speed limit sign is missing ahead, the correct speed limit sign may be displayed on the driver instrument panel via augmented reality. In another example, if it is determined that a stop sign is damaged ahead, the stop sign may be displayed on the instrument panel via augmented reality. Additionally, due to the extreme safety concerns of a damaged stop sign, the stop sign may also be announced over a vehicle audio system or other additional vehicle system. In another example, if it is determined that a lane marking is missing, the missing lane marking may be displayed along with an additional visual such as an arrow and/or written displays. As such, the determined level of augmented reality to be displayed to the driver may be pre-determined based on the type of signage determined to be ineffective. The augmented reality may also continue to be displayed until the vehicle 10 is determined to be outside the ineffective signage area at step 610. In some examples, the vehicle processor 200 uses the vehicle location to determine whether the vehicle 10 is outside the ineffective signage area. However, it is also contemplated that the vehicle processor 200 may communicate the vehicle location to the server 300 or the third-party processor 400 to determine whether the vehicle 10 is outside the effective signage area.

Referring again to FIGS. 1-4, the signage monitoring system 100 includes the vehicle processor 200 storing vehicle data 202 including vehicle location 204, vehicle event data 206, and existing outdoor signage information 208. The vehicle processor 200 may communicate with the server 300 to determine existing outdoor signage effectiveness based on correlated vehicle event data 206 and vehicle location data 204 from a plurality of vehicles. Once the server 300 determines an existing outdoor signage to be ineffective, the server 300 may then notify the proper authorities so that the existing outdoor signage may be updated or replaced and/or may communicate with the vehicle processor 200 to display effective signage through augmented reality. Thus, the signage monitoring system 100 may advantageously assist in monitoring the effectiveness of existing signage and also take the necessary steps to mitigate safety concerns due to missing and/or damaged signage.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A signage monitoring system for a vehicle, the signage monitoring system comprising:
   a vehicle processor storing data including vehicle location, vehicle event data, and existing outdoor signage information; and
   a server communicatively coupled to the vehicle processor and configured to determine existing outdoor signage effectiveness based on correlated vehicle event data and vehicle location data from a plurality of vehicles.

2. The signage monitoring system of claim 1, wherein at least one of the data stored by the vehicle processor is captured through video taken by cameras disposed on the vehicle.

3. The signage monitoring system of claim 1, wherein the server is configured to determine existing outdoor signage effectiveness based on whether vehicle event data and existing outdoor signage information correlation is above a predetermined correlation threshold.

4. The signage monitoring system of claim 3, wherein if the server determines the existing outdoor signage effectiveness is less than the predetermined correlation threshold, the server is configured to display a sign through augmented reality.

5. The signage monitoring system of claim 4, wherein the server continues to display the sign through augmented reality until the vehicle leaves the vehicle location.

6. The signage monitoring system of claim 1, wherein vehicle event data is based on a vehicle event including one or more of change in vehicle speed, change in vehicle direction, or change in vehicle lane.

7. The signage monitoring system of claim 1, wherein the data stored by the vehicle processor is stored in the vehicle processor for less than approximately 15 minutes.

8. A vehicle incorporating the signage monitoring system of claim 1.

9. A signage monitoring system for a vehicle, the signage monitoring system comprising:
   a vehicle processor storing data including vehicle location, vehicle event data, and existing outdoor signage information; and
   a server communicatively coupled to the vehicle processor and configured to:
      determine occurrence of a vehicle event using vehicle event data;
      correlate vehicle event data, vehicle location, and existing outdoor signage information;

determine effectiveness of outdoor signage based on the correlation of vehicle event data, vehicle location, and existing outdoor signage information; and recommend changes to the existing outdoor signage.

10. The signage monitoring system of claim 9, wherein at least one of the data stored by the vehicle processor is captured through video taken by cameras disposed on the vehicle.

11. The signage monitoring system of claim 9, wherein the server is configured to determine if the existing outdoor signage is effective based on whether vehicle event data and existing outdoor signage information correlation is above a predetermined correlation threshold.

12. The signage monitoring system of claim 11, wherein if the server determines the existing outdoor signage effectiveness is less than the predetermined correlation threshold, the server is configured to display a sign through augmented reality.

13. The signage monitoring system of claim 12, wherein the server continues to display the sign through augmented reality until the vehicle leaves the vehicle location.

14. The signage monitoring system of claim 9, wherein the vehicle event data is based on a vehicle event including one or more of change in vehicle speed, change in vehicle direction, or change in vehicle lane.

15. A signage monitoring system for a vehicle, the signage monitoring system comprising:

a vehicle processor storing data including vehicle location, vehicle event data, and existing outdoor signage information, wherein the vehicle location is gathered from one or more of a Global Positioning System (GPS), a user device, or a third party application; and a server communicatively coupled to the vehicle processor and configured to:

determine an occurrence of a vehicle event;

correlate the vehicle event data from the occurrence of the vehicle event with the vehicle location and the existing outdoor signage information;

determine whether existing outdoor signage information is effective based on the correlation of the vehicle event data, the vehicle location, and the existing outdoor signage information; and display signage via augmented reality if the existing outdoor signage information is determined to be ineffective.

16. The signage monitoring system of claim 15, wherein at least one of the data stored by the vehicle processor is captured through video taken by cameras disposed on the vehicle.

17. The signage monitoring system of claim 15, wherein the server is configured to determine if the existing outdoor signage is effective based on whether vehicle event data and existing outdoor signage information correlation is above a predetermined correlation threshold.

18. The signage monitoring system of claim 15, wherein the server continues to display the signage through augmented reality until the vehicle leaves the vehicle location.

19. The signage monitoring system of claim 15, wherein vehicle event data is based on a vehicle event including one or more of change in vehicle speed, change in vehicle direction, or change in vehicle lane.

20. A vehicle incorporating the signage monitoring system of claim 15.

* * * * *